United States Patent
Weathersby

(10) Patent No.: US 6,692,073 B1
(45) Date of Patent: Feb. 17, 2004

(54) INFANT CAR SEAT/CARRIER APPARATUS

(76) Inventor: Linda M. Weathersby, 11321 S. Hermosa, Chicago, IL (US) 60643

( * ) Notice: Subject to any disclaimer, the term of this patent is extended or adjusted under 35 U.S.C. 154(b) by 0 days.

(21) Appl. No.: 10/211,152

(22) Filed: Aug. 2, 2002

(51) Int. Cl.$^7$ ................................................ B60N 2/28
(52) U.S. Cl. ........................ 297/256.16; 297/256.13
(58) Field of Search ...................... 297/250.1, 256.13, 297/256.16, 130, 256.11

(56) References Cited

U.S. PATENT DOCUMENTS

| | | | |
|---|---|---|---|
| 4,744,599 A | * 5/1988 | Jankowski et al. | .... 297/256.16 |
| D321,449 S | 11/1991 | Meeker | |
| 5,143,419 A | 9/1992 | Tepper et al. | |
| 5,230,523 A | 7/1993 | Wilhelm | |
| 5,277,472 A | 1/1994 | Freese et al. | |
| 5,322,343 A | 6/1994 | Parker et al. | |
| 5,562,548 A | * 10/1996 | Pinch et al. | ............ 297/256.16 |
| 5,567,008 A | * 10/1996 | Cone, II | ................ 297/256.16 |
| 5,772,279 A | * 6/1998 | Johnson, Jr. | ................ 297/130 |
| 6,070,890 A | 6/2000 | Haut et al. | |
| 6,183,044 B1 | * 2/2001 | Koyanagi et al. | ....... 297/256.16 |

* cited by examiner

*Primary Examiner*—Peter R. Brown

(57) ABSTRACT

A infant car seat/carrier apparatus for converting a car seat/carrier to one that swings back and forth for the comfort of the infant. The infant car seat/carrier apparatus includes a base assembly including a base member and also including fastening members being movably mounted to the base member; and also includes a seat support assembly including a support base being detachably mounted upon the base member and also including elongate support members being extendably attached to the support base; and further includes a seat/carrier assembly including a seat member, and also including a handle assembly being attached to the seat member and to the elongate support members.

6 Claims, 2 Drawing Sheets

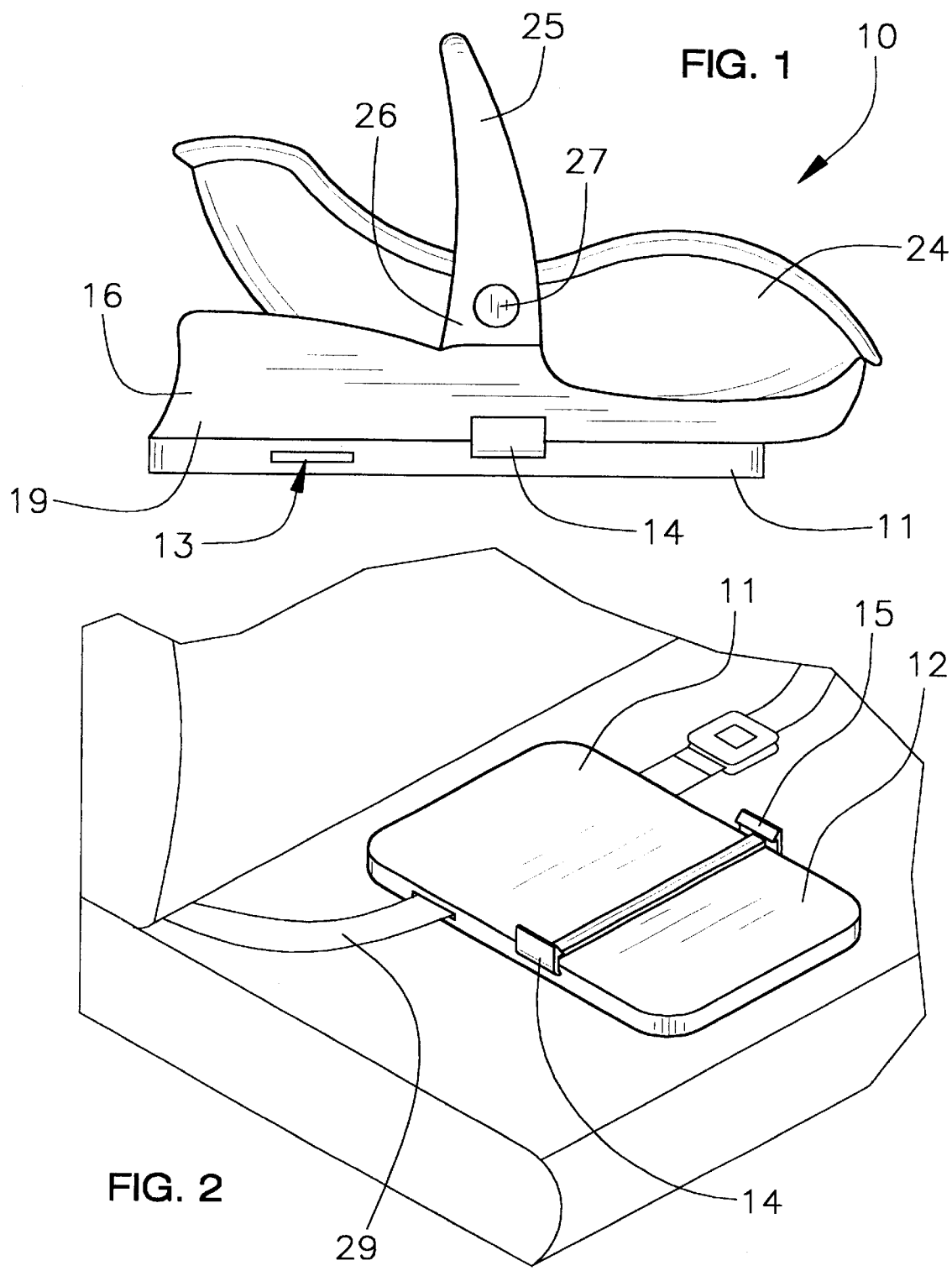

INFANT CAR SEAT/CARRIER APPARATUS

BACKGROUND OF THE INVENTION

1. Field of the Invention

The present invention relates to infant car seats/carriers and more particularly pertains to a new infant car seat/carrier apparatus for converting a car seat/carrier to one that swings back and forth for the comfort of the infant.

2. Description of the Prior Art

The use of infant car seats/carriers is known in the prior art. More specifically, infant car seats/carriers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,322,343; U.S. Pat. No. 5,143,419; U.S. Pat. No. 5,277,472; U.S. Pat. No. Des. 321,449; U.S. Pat. No. 5,230,523; and U.S. Pat. No. 6,070,890.

While these devices fulfill their respective, particular objectives and requirements, the aforementioned patents do not disclose a new infant car seat/carrier apparatus. The inventive device includes a base assembly including a base member and also including fastening members being movably mounted to the base member; and also includes a seat support assembly including a support base being detachably mounted upon the base member and also including elongate support members being extendably attached to the support base; and further includes a seat/carrier assembly including a seat member, and also including a handle assembly being attached to the seat member and to the elongate support members.

In these respects, the infant car seat/carrier apparatus according to the present invention substantially departs from the conventional concepts and designs of the prior art, and in so doing provides an apparatus primarily developed for the purpose of converting a car seat/carrier to one that swings back and forth for the comfort of the infant.

SUMMARY OF THE INVENTION

In view of the foregoing disadvantages inherent in the known types of infant car seats/carriers now present in the prior art, the present invention provides a new infant car seat/carrier apparatus construction wherein the same can be utilized for converting a car seat/carrier to one that swings back and forth for the comfort of the infant.

The general purpose of the present invention, which will be described subsequently in greater detail, is to provide a new infant car seat/carrier apparatus which has many of the advantages of the infant car seats/carriers mentioned heretofore and many novel features that result in a new infant car seat/carrier apparatus which is not anticipated, rendered obvious, suggested, or even implied by any of the prior art infant car seats/carriers, either alone or in any combination thereof.

To attain this, the present invention generally comprises a base assembly including a base member and also including fastening members being movably mounted to the base member; and also includes a seat support assembly including a support base being detachably mounted upon the base member and also including elongate support members being extendably attached to the support base; and further includes a seat/carrier assembly including a seat member, and also including a handle assembly being attached to the seat member and to the elongate support members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new infant car seat/carrier apparatus which has many of the advantages of the infant car seats/carriers mentioned heretofore and many novel features that result in a new infant car seat/carrier apparatus which is not anticipated, rendered obvious, suggested, or even implied by any of the prior art infant car seats/carriers, either alone or in any combination thereof.

It is another object of the present invention to provide a new infant car seat/carrier apparatus which may be easily and efficiently manufactured and marketed.

It is a further object of the present invention to provide a new infant car seat/carrier apparatus which is of a durable and reliable construction.

An even further object of the present invention is to provide a new infant car seat/carrier apparatus which is susceptible of a low cost of manufacture with regard to both materials and labor, and which accordingly is then susceptible of low prices of sale to the consuming public, thereby making such infant car seat/carrier apparatus economically available to the buying public.

Still yet another object of the present invention is to provide a new infant car seat/carrier apparatus which provides in the apparatuses and methods of the prior art some of the advantages thereof, while simultaneously overcoming some of the disadvantages normally associated therewith.

Still another object of the present invention is to provide a new infant car seat/carrier apparatus for converting a car seat/carrier to one that swings back and forth for the comfort of the infant.

Yet another object of the present invention is to provide a new infant car seat/carrier apparatus which includes a base assembly including a base member and also including fastening members being movably mounted to the base member; and also includes a seat support assembly including a support base being detachably mounted upon the base member and also including elongate support members being extendably attached to the support base; and further includes a seat/carrier assembly including a seat member, and also including a handle assembly being attached to the seat member and to the elongate support members.

Still yet another object of the present invention is to provide a new infant car seat/carrier apparatus that is easy and convenient to use.

Even still another object of the present invention is to provide a new infant car seat/carrier apparatus that effectively combines a car seat/carrier and a swing into one complete unit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a new infant car seat/carrier apparatus according to the present invention.

FIG. 2 is a perspective view of the base member of the present invention.

DESCRIPTION OF THE PREFERRED.EMBODIMENT

Figure 3:
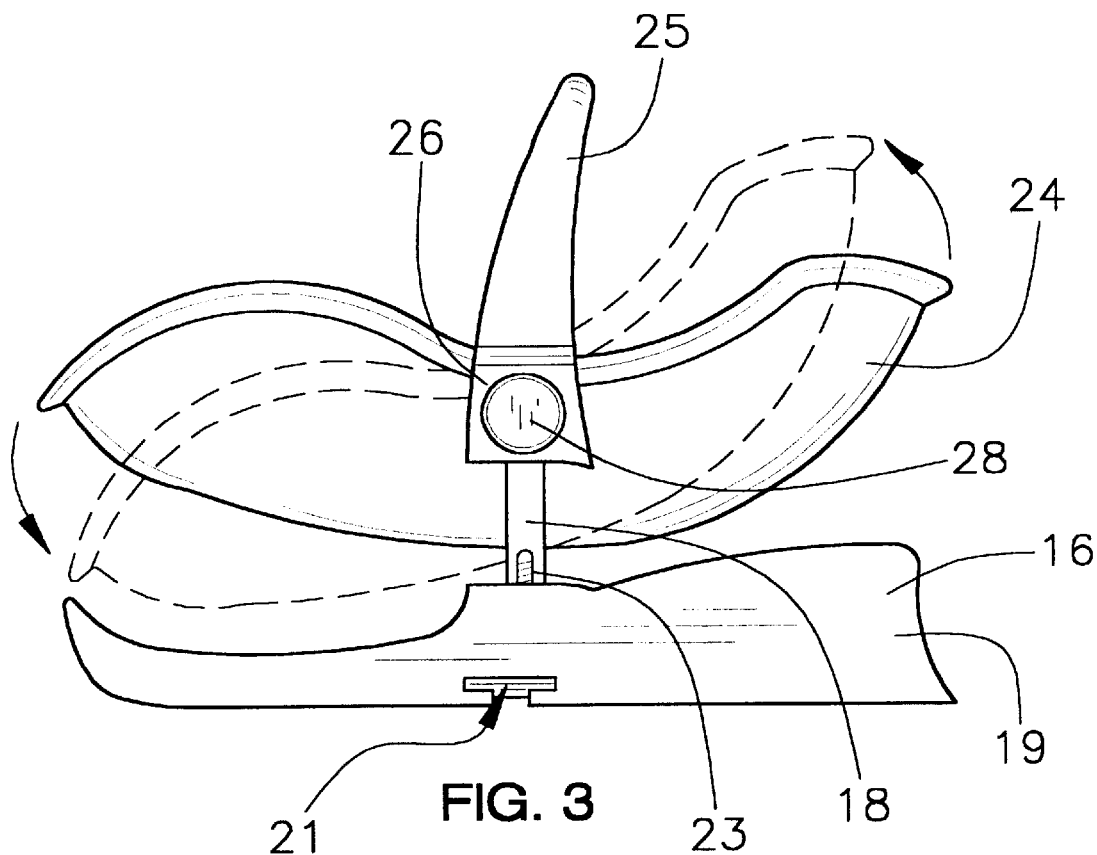
FIG. 3 is another side elevational view of the present invention.
Figure 4:
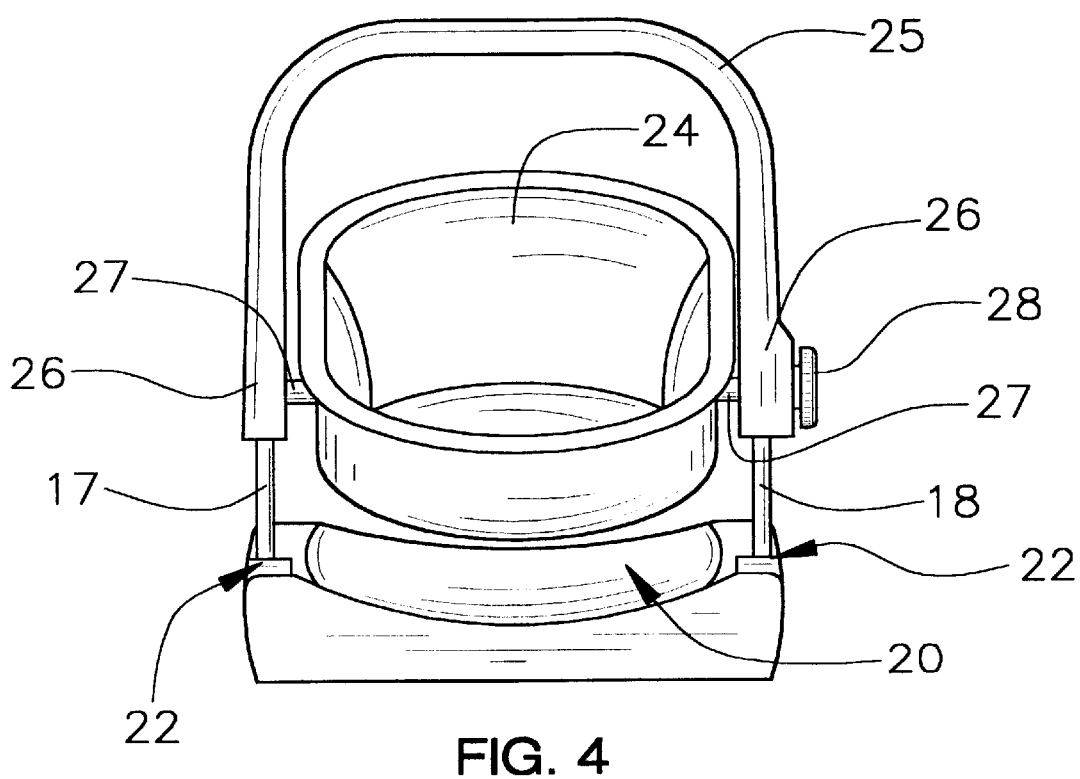
FIG. 4 is a front perspective view of the present invention.

With reference now to the drawings, and in particular to FIGS. 1 through 4 thereof, a new infant car seat/carrier apparatus embodying the principles and concepts of the present invention and generally designated by the reference numeral 10 will be described.

As best illustrated in FIGS. 1 through 4, the infant car seat/carrier apparatus 10 generally comprises a base assembly including a base member 11 and also including fastening members 14,15 being movably and conventionally mounted to the base member 11. The base member 11 is a board having a top surface 12 and also having a bore 13 extending therethrough from one side edge to an opposed side edge and being adapted to receive a seat belt strap 29 in a vehicle. The fastening members 14,15 include spring-loaded clip members being conventionally attached along the side edges of the board 11.

A seat support assembly includes a support base 16 being detachably mounted upon the base member 11 and also includes elongate support members 17,18 being extendably attached to the support base 16. The support base 16 includes side walls 19, a beveled top surface 20, and first slots 21 being disposed in the side walls 19 for receiving the spring-loaded clip members 14,15 to secure the support base 16 to the board 11, and also includes second slots 22 being disposed in a perimeter of the beveled top surface 20. The seat support assembly further includes locking spring members 24 being conventionally disposed in the second slots 22. The elongate support members 17,18 are height adjustably disposed in the second slots 22 and are engagable to the locking spring members 24.

A seat/carrier assembly includes a seat member 24, and also includes a handle assembly being conventionally attached to the seat member 24 and to the elongate support members 17,18. The handle assembly includes an inverted U-shaped tubular handle member 25 having tubular end portions 26 which are conventionally mounted upon the elongate support members 17,18. The seat/carrier assembly further includes pivot members 27 being journaled to the tubular end portions 26 of the handle member 25 and being conventionally attached to the seat member 24, and also includes a knob 28 being conventionally attached to one of the pivot members 27 for swinging the seat member 24 back and forth.

In use, the base member 11 is securely strapped into a car seat, and the support base 16 is securely mounted upon the base member 11 using the fastening members 14,15 with the seat member 24 resting upon the support base 16. The user can remove the seat/carrier assembly and the seat support assembly and can move the seat member 24 spaced above the support base 16 and can turn the knob 28 to swing the seat member 24 back and forth.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An infant car seat/carrier apparatus comprising:
   a base assembly including a base member and also including fastening members being movably mounted to said base member;
   a seat support assembly including a support base being detachably mounted upon said base member and also including elongate support members being attached to said support base;
   a seat/carrier assembly including a seat member, and also including a handle assembly being attached to said seat member; and
   said seat/carrier assembly being attached to said elongate support members for positioning said seat/carrier assembly on said seat support assembly.

2. An infant car seat/carrier apparatus as described in claim 1, wherein said fastening members include spring-loaded clip members being attached along said side edges of said board.

3. An infant car seat/carrier apparatus as described in claim 2, wherein said support base includes side walls, a beveled top surface, and first slots being disposed in said walls for receiving said spring-loaded clip members to secure said support base to said board.

4. An infant car seat/carrier apparatus as described in claim 1, wherein said handle assembly includes an inverted U-shaped tubular handle member having tubular end portions which are mounted upon said elongate support members.

5. An infant car seat/carrier apparatus as described in claim 4, wherein said seat/carrier assembly further includes pivot members being journaled to said tubular end portions of said handle member and being attached to said seat member, and also includes a knob being attached to one of said pivot members for swinging said seat member back and forth.

6. An infant car seat/carrier apparatus comprising:

a base assembly including a base member and also including fastening members being movably mounted to said base member, said base member being a board having a top surface and also having a bore extending therethrough from one side edge to an opposed side edge and being adapted to receive a seat belt strap in a vehicle, said fastening members including spring-loaded clip members being attached along said side edges of said board;

a seat support assembly including a support base being detachably mounted upon said base member and also including elongate support members being attached to said support base, said support base including side walls, a beveled top surface, and first slots being disposed in said side walls for receiving said spring-loaded clip members to secure said support base to said board; and a seat/carrier assembly including a seat member, and also including a handle assembly being attached to said seat member and to said elongate support members, said seat/carrier assembly being attached to said elongate support members for positioning said seat/carrier assembly on said seat support assembly; and said handle assembly including an inverted U-shaped tubular handle member having tubular end portions which are mounted upon said elongate support members, said seat/carrier assembly further including pivot members being journaled to said tubular end portions of said handle member and being attached to said seat member, and also including a knob being attached to one of said pivot members for swinging said seat member back and forth.

* * * * *